United States Patent [19]

Marriner

[11] Patent Number: 4,872,503
[45] Date of Patent: Oct. 10, 1989

[54] AIR HEAT EXCHANGER

[76] Inventor: Raymond E. Marriner, Box 7, Site 16, R.R. 7, Calgary, Alta., Canada, T2P 2G7

[21] Appl. No.: 839,207

[22] Filed: Mar. 13, 1986

[51] Int. Cl.$^4$ .............................................. F24H 3/02
[52] U.S. Cl. ...................................... 165/54; 165/160; 165/163; 165/905
[58] Field of Search .................. 165/54, 46, 901, 905, 165/909, 160, 163, 95, 72, 75; 34/86; 98/33.1

[56] References Cited

U.S. PATENT DOCUMENTS

| | | | |
|---|---|---|---|
| 2,023,492 | 12/1935 | Smith | 165/54 |
| 2,488,333 | 11/1949 | Schlachter | 165/54 |
| 2,663,549 | 12/1953 | Otten | 165/163 |
| 2,820,615 | 1/1958 | Peters | 165/184 |
| 3,499,484 | 3/1970 | Lanzoni | 165/163 |
| 3,616,849 | 11/1971 | Dijt | 165/160 |
| 3,802,499 | 4/1974 | Garcea | 165/159 |
| 4,138,288 | 2/1979 | Lewin | 165/184 |
| 4,232,735 | 11/1980 | Kim et al. | 165/184 |
| 4,512,393 | 4/1985 | Maendel | 165/54 |
| 4,550,773 | 11/1985 | Martin | 165/54 |

FOREIGN PATENT DOCUMENTS

| | | | |
|---|---|---|---|
| 1121336 | 4/1982 | Canada | 165/163 |
| 1192901 | 9/1985 | Canada . | |
| 0010818 | 5/1980 | European Pat. Off. | 165/905 |
| 0108525 | 5/1984 | European Pat. Off. | 165/160 |
| 3012961 | 6/1981 | Fed. Rep. of Germany | 165/159 |
| 2465179 | 4/1981 | France | 165/163 |
| 2494830 | 5/1982 | France | 165/163 |
| 0121329 | 9/1980 | Japan | 165/901 |
| 0152387 | 11/1980 | Japan | 165/901 |
| 0115925 | 7/1984 | Japan | 165/54 |
| 7902404 | 9/1980 | Netherlands | 165/901 |
| 2032091 | 1/1980 | United Kingdom | 165/160 |

*Primary Examiner*—John Ford

[57] ABSTRACT

A tube-within-a-tube, counter flow, air-to-air heat exchanger utilizing a rigid outer tube and a continuous, flexible inner tube. The corrugated, flexible inner tube is spiralled longitudinally around a center core and creates turbulence in the air which permits a rapid exchange of heat between the exhaust and fresh air streams.

4 Claims, 1 Drawing Sheet

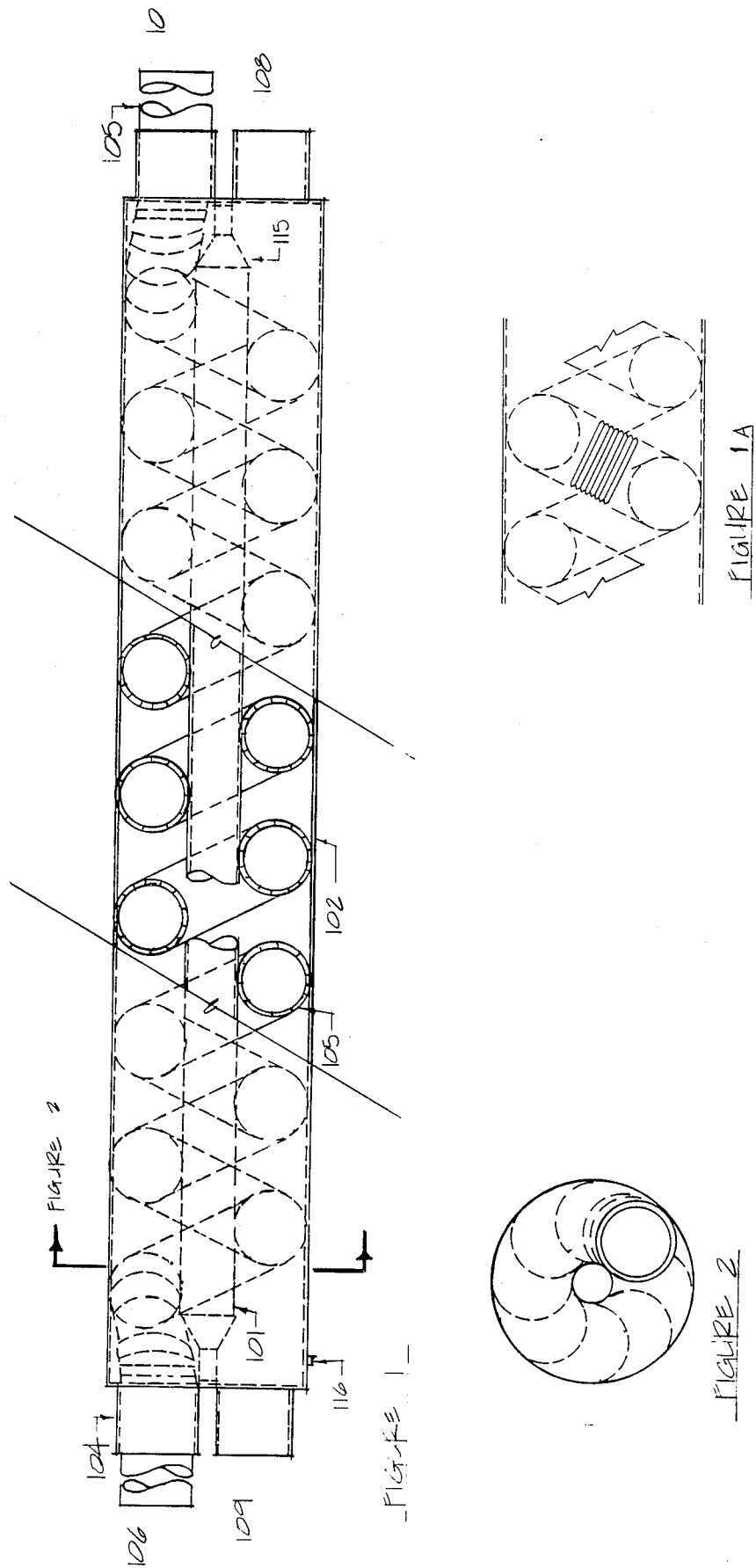

AIR HEAT EXCHANGER

SUMMARY

This invention is a tube within a tube heat exchanger, it permits the transfer of heat from the exhaust air of a building or other enclosed space to incoming fresh air. In this invention the transfer of heat is effected through the wall of the flexible inner tube. In order for the transfer to take place the air has to be slowed down and made turbulent; this is accomplished by the use of a spiral configuration of the inner tube.

The incoming fresh air is directed through the continuous, flexible inner tube and the exhaust air is directed through the space in outer tube which is outside of the inner tube. The two air streams flow in opposite directions and are controlled by remotely or integrally mounted fans and dampers.

DESCRIPTION OF DRAWINGS

FIG. 1 shows a longitudinal section view of the invention with a cylindrical outer tube and an inner tube with a spiral configuration.

FIG. 1a shows the typical corrugations of the inner tube.

FIG. 2 shows a cross section view of FIG. 1.

DETAILED DESCRIPTION

This invention is a further development of Canadian Pat. No. CA1192901. Transfer of heat through the wall of a continuous, flexible inner tube, through which the fresh air flows, from the warm exhaust air flowing through the space between the inner and outer tubes is common to Canadian Pat. No. CA1192901 and this application. Beyond these elements the differences are such that this should be considered a separate invention. The heat exchanger is designed to provided fresh, pre-warmed air and to exhaust an equal amount of stale air from any enclosed space such as a home, workshop or office. The heat exchanger may exhaust stale air from and introduce fresh air to an enclosed space at a number of points through a system of ducts attached to the exhaust inlet and fresh air outlet of the heat exchanger. A duct from outside of the building transports fresh air to the heat exchanger and another duct transports cooled, stale air to a different location on the outside of the building. The heat exchanger may be located in, or remotely from the enclosed area(s) which it serves.

The basic principle of the exchange of heat from the air on one side of a membrane to the air on the other side is common to many heat exchangers. Adequate exchange is usually accomplished by directing the air flow over a large area of membrane, through a labyrinth of airways; this results in considerable pressure drop and a relatively slow air movement, creating a tendency for the freezing of condensed moisture in the exhaust airways. In this invention pressure drop is minimized as the total cross section area of both the fresh air and exhaust air passageways remain undivided and constant throughout the heat exchanger.

The heat exchange occurs primarily because of air turbulence inside and outside of the inner tube. The ratio of the cross section area of the inner tube in relation to its surface area, the ratio of the cross section area of the inner tube to the cross section area of the outer tube and the volume of air passing through the heat exchanger are some of the factors which will have an effect on the heat recovery and efficiency of the invention. The results which are desired will determine the size and configuration of the heat exchanger.

Following is a detailed description of the invention referring to the numbers appearing on the drawings.

The outer tube(102) is circular in cross section and can be made from any material which will provide a rigid, sealed enclosure. The flexible inner tube(105) is made of metal or plastic formed with corrugations which, when installed in a spiral configuration, positions the corrugations generally parallel to the diameter of the inner tube and perpendicular to the air flows inside and outside of the inner tube. The inner tube(105), which carries the fresh air is spiralled around a center core(101) throughout the length of the heat exchanger. The center core prevents exhaust air from flowing directly through the center of the spiral. The fresh air inlet(106) is connected to a duct which transports air from outside of the building. The fresh air outlet(107) is connected to a duct system which distributes the air to the chosen area within the building. The exhaust air inlet(108) is connected to ducts which draw stale air from the chosen location(s) within the building. The exhaust air outlet(109) is connected to a duct which transports the stale air to a location on the exterior of the building. A drain(116) is provided for condensate.

As will be readily apparent to those skilled in the art the above description represents preferred but nonetheless illustrative embodiments of the subject invention, which may be realized in other specific forms without departing from its spirit or essential characteristics. Therefore the full scope of such an invention is to be measured by the appended claims, giving thereto the full range of equivalences which comes within the meaning and range of the claims.

The embodiments of the invention in which an exclusive property or privilege is claimed are defined as follows:

1. An air-to-air heat exchanger to transfer heat from air which is being exhausted from an enclosed space, to incoming fresh air comprising: a rigid, circular in cross section outer tube, a central core around which a continuous flexible inner tube is spiralled longtitudinally, inlets and outlets for each of the inner and outer tubes connected to the fresh and exhaust air flows respectively so as to effect a counter-current flow through the heat exchanger.

2. The heat exchanger of claim 1 wherein the inner flexible tube is formed of metal which has corrugations which, when installed in a spiral configuration, are generally parallel to the diameter of the inner tube.

3. The heat exchanger of claim 1 wherein the inner flexible tube is formed of plastic which has corrugations which, when installed in a spiral configuration, are generally parallel to the diameter of the inner tube.

4. The heat exchanger of claims 1, 2 or 3 wherein the inner tube is spiralled in a manner which permits proper spacing of the spirals to permit adequate flow of exhaust air.

* * * * *